(12) United States Patent
Webb

(10) Patent No.: US 10,331,314 B2
(45) Date of Patent: Jun. 25, 2019

(54) USER INTERFACE INCLUDING RECYCLABLE MENU

(71) Applicants: DENSO International America, Inc., Southfield, MI (US); DENSO CORPORATION, Kariya-shi, Aichi-ken (JP)

(72) Inventor: Gareth Webb, Farmington, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 545 days.

(21) Appl. No.: 15/068,097

(22) Filed: Mar. 11, 2016

(65) Prior Publication Data
US 2017/0262158 A1 Sep. 14, 2017

(51) Int. Cl.
*G06F 3/0484* (2013.01)
*G06F 3/0488* (2013.01)

(52) U.S. Cl.
CPC ........ *G06F 3/04842* (2013.01); *G06F 3/0488* (2013.01)

(58) Field of Classification Search
CPC ... G06F 3/048–04897; G06F 17/30115; G06F 2203/04803–04808; B60K 37/00; H04M 1/2477; H04N 1/00437; H04N 1/00424; G06K 9/00026; G11B 19/025
See application file for complete search history.

(56) References Cited

U.S. PATENT DOCUMENTS

| | | | | |
|---|---|---|---|---|
| 5,712,995 A | * | 1/1998 | Cohn | G06F 3/0481 715/792 |
| 5,835,088 A | * | 11/1998 | Jaaskelainen, Jr. ... | G06F 3/0481 715/803 |
| 6,369,717 B1 | * | 4/2002 | Damiani | B60K 35/00 340/815.4 |
| 6,832,355 B1 | * | 12/2004 | Duperrouzel | G06F 17/30905 707/E17.121 |
| 6,998,971 B2 | * | 2/2006 | Ito | G05B 15/02 340/438 |
| 8,504,937 B2 | | 8/2013 | Jobs et al. | |
| 9,690,592 B2 | * | 6/2017 | Matsuyama | G06F 9/445 |
| 9,779,685 B2 | * | 10/2017 | Ishiguro | G09G 5/003 |

(Continued)

FOREIGN PATENT DOCUMENTS

JP 2014119914 A 6/2014

*Primary Examiner* — Kieu D Vu
*Assistant Examiner* — Alvaro R Calderon, IV
(74) *Attorney, Agent, or Firm* — Harness, Dickey & Pierce, P.L.C.

(57) ABSTRACT

A user interface system including a display and a control module. The control module displays a plurality of active tiles in an active area of the display, and displays a plurality of inactive tiles in an inactive area of the display. An inactive tile selected by a user is moved to the active area, and an application associated with the selected tile is activated. An active tile having a priority level that is lower than a priority level of the selected tile is moved to the inactive area. In the active area, the tile having the lower priority level is replaced with the selected tile having the higher priority level. The inactive tiles of the inactive area are arranged in order of decreasing priority.

18 Claims, 5 Drawing Sheets

(56) References Cited

U.S. PATENT DOCUMENTS

| | | | |
|---|---|---|---|
| 2002/0093539 A1* | 7/2002 | Os | G06F 3/0482 715/810 |
| 2004/0053605 A1* | 3/2004 | Martyn | G06F 3/0482 455/418 |
| 2004/0122572 A1* | 6/2004 | Ichinose | B60K 35/00 701/36 |
| 2005/0149879 A1* | 7/2005 | Jobs | G06F 3/0481 715/796 |
| 2006/0218499 A1* | 9/2006 | Matthews | G06F 17/30616 715/765 |
| 2007/0101290 A1* | 5/2007 | Nakashima | G01C 21/265 715/797 |
| 2007/0150810 A1* | 6/2007 | Katz | G06F 3/0481 715/229 |
| 2007/0182721 A1* | 8/2007 | Watanabe | G06F 3/04886 345/173 |
| 2007/0265772 A1* | 11/2007 | Geelen | G01C 21/26 701/532 |
| 2007/0288864 A1* | 12/2007 | Keereepart | G06F 17/30696 715/790 |
| 2008/0034317 A1* | 2/2008 | Fard | G06F 3/0481 715/781 |
| 2009/0031247 A1* | 1/2009 | Walter | G06F 9/451 715/788 |
| 2009/0160732 A1* | 6/2009 | Kimura | G01C 21/3664 345/1.1 |
| 2009/0284467 A1* | 11/2009 | Itoh | G06F 3/016 345/157 |
| 2010/0100841 A1* | 4/2010 | Shin | G06F 3/04817 715/784 |
| 2010/0211872 A1* | 8/2010 | Rolston | G06F 3/0482 715/702 |
| 2010/0268426 A1* | 10/2010 | Pathak | G06F 3/03547 701/48 |
| 2010/0277438 A1* | 11/2010 | Kawashima | B60K 35/00 345/175 |
| 2011/0028138 A1* | 2/2011 | Davies-Moore | G06F 3/04817 455/418 |
| 2012/0215404 A1* | 8/2012 | Sugiyama | G06F 5/00 701/36 |
| 2013/0063443 A1* | 3/2013 | Garside | G06T 15/005 345/473 |
| 2013/0145297 A1* | 6/2013 | Ricci | H04W 4/90 715/765 |
| 2013/0151983 A1* | 6/2013 | Lovitt | G06F 3/0481 715/745 |
| 2013/0241720 A1* | 9/2013 | Ricci | G06F 3/0486 340/425.5 |
| 2013/0245858 A1* | 9/2013 | Yonehara | G05D 1/0016 701/2 |
| 2013/0293364 A1* | 11/2013 | Ricci | B60K 35/00 340/425.5 |
| 2014/0013271 A1* | 1/2014 | Moore | G06F 3/0482 715/792 |
| 2014/0164966 A1* | 6/2014 | Kim | G06F 3/04886 715/769 |
| 2014/0277843 A1* | 9/2014 | Langlois | H04M 1/6091 701/2 |
| 2016/0328244 A1* | 11/2016 | Ahmed | G06F 3/0482 |
| 2016/0342406 A1* | 11/2016 | Ahmed | G06F 9/451 |
| 2017/0010766 A1* | 1/2017 | Nakashima | G06F 3/0482 |

* cited by examiner

USER INTERFACE INCLUDING RECYCLABLE MENU

FIELD

The present disclosure relates to a user interface, and particularly to a recyclable menu for a user interface.

BACKGROUND

This section provides background information related to the present disclosure, which is not necessarily prior art.

User interfaces are often used to facilitate control of various systems. For example, vehicles often include a user interface for controlling various devices and functionality available to a user, such as a navigation system, an audio system, a video system, a telecommunications system, weather information, a personal calendar, restaurant information, and system settings. While current user interfaces are suitable for their intended use, they are subject to improvement.

SUMMARY

This section provides a general summary of the disclosure, and is not a comprehensive disclosure of its full scope or all of its features.

The present teachings include a user interface system including a display and a control module. The control module is configured to: display a plurality of active tiles in an active area of the display; display a plurality of inactive tiles in an inactive area of the display; assign a priority level to each one of the active tiles and the inactive tiles; activate an inactive tile selected by a user by moving the selected tile to the active area and activating an application associated with the selected tile, the selected tile having a first priority level; deactivate an active tile having a second priority level that is lower than the first priority level by moving the active tile with the second priority level to the inactive area; replace in the active area the active tile having the second priority tile level with the selected tile having the first priority level; and arrange the inactive tiles of the inactive area in order of decreasing priority level.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
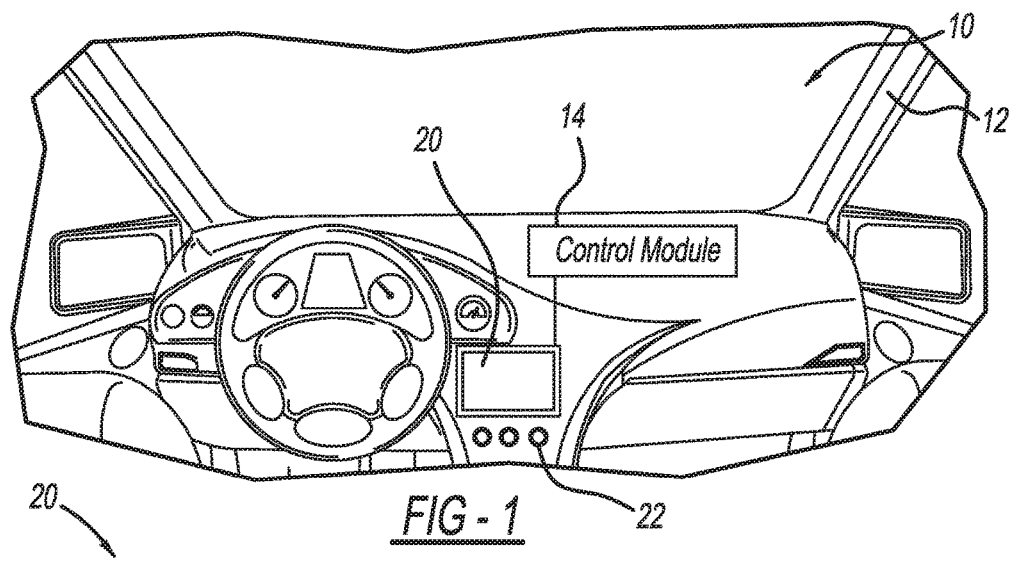
FIG. 1 illustrates a passenger cabin of a vehicle including a user interface system according to the present teachings.

With initial reference to FIG. 1, a passenger cabin 10 of an exemplary vehicle 12 is illustrated. The vehicle 12 includes a user interface system according to the present teachings, which includes a control module 14, a display 20 controlled by the control module 14, and a reset or default button 22, which may be any suitable selector. The user interface systems and methods according to the present teachings can be used with any suitable vehicle, such as any suitable passenger vehicle, mass transit vehicle, military vehicle, construction vehicle, aircraft, watercraft, etc. The user interface systems and methods according to the present teachings can also be used with any other suitable devices or control systems.

The display 20 may be any suitable display. For example, the display 20 may be any suitable touch screen display. The control module 14 can be any suitable device configured to control the display 20 as described herein to provide the features and methods of the present teachings. For example, the control module 14 can include any suitable processor, control circuit, or any other suitable computing device. The control module 14 may refer to, be part of, or include processor hardware (shared, dedicated, or group) that executes code, and may further include any suitable memory hardware (shared, dedicated, or group) storing code executed by the processor hardware. The code is configured to operate the display 20 as described herein, and otherwise provide the described features of the user interface systems and methods according to the present teachings. The control module 14 is configured to display information of, and/or an interface of, any suitable application for use by occupants of the vehicle 12, as described herein.

Figure 2:
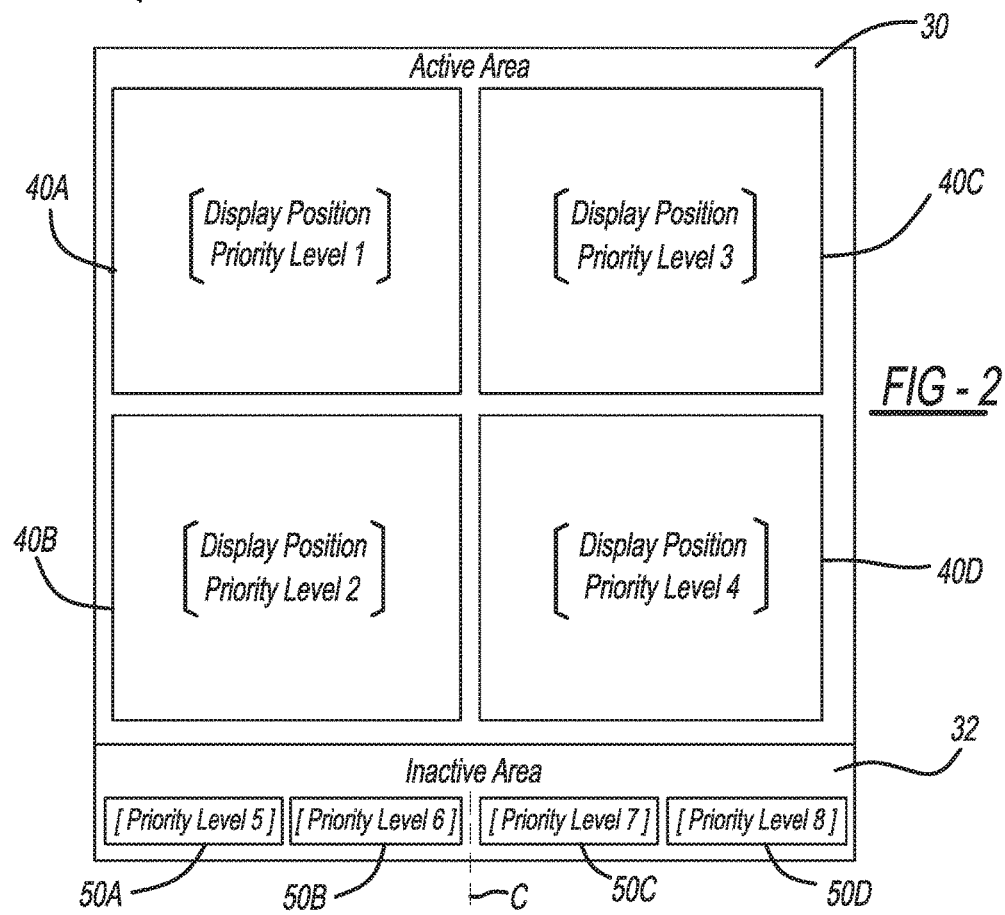
FIG. 2 illustrates a display of the user interface system, the display divided into an active area and an inactive area, each of which includes a plurality of display positions with different priority levels assigned thereto.

With reference to FIG. 2, the display 20 is divided by the control module 14 into an active area 30 and an inactive area 32. The control module 14 further divides the active area 30 into any suitable number of active display positions, such as four active display positions 40A, 40B, 40C, and 40D in the example illustrated, and assigns a priority level to each one of the display positions 40A-40D. In the example illustrated, the display positions 40A-40D are equally sized, but the control module 14 can provide the display positions 40A-40D with various different sizes, and can arrange the display positions 40A-40D at any other suitable location about the active area 30. Although the active area 30 is illustrated as being above the inactive area 32, the active and inactive areas 30 and 32 can be arranged at any other suitable locations about the display 20. For example, the inactive area 32 may be above the active area 30. The control module 14 can provide the inactive area 32 with any suitable number of display positions, such as four display positions 50A-50D in the example illustrated.

Each one of the active display positions 40A-40D and the inactive display positions 50A-50D is assigned a different display position priority level by the control module 14. In the example illustrated in FIG. 2, the active display position 40A at the upper left hand corner of the active area 30 is assigned display position priority level 1. The active display position 40B at the lower left hand corner of the active area 30 is assigned display position priority level 2. The active display position 40C at the upper right hand corner of the active area 30 is assigned display position priority level 3. The active display position 40D at the lower right hand corner of the active area 30 is assigned display position priority level 4. The display position priority levels of FIG. 2 of the display positions 40A-40D and 50A-50D determine where different application tiles 60A-60H will be positioned by the control module 14 when selected by a user, as described in detail herein.

The arrangement of the priority levels 1-4 illustrated in FIG. 2 may be best suitable for vehicles having a steering wheel on the left hand side of the vehicle because the active display position 40A having priority level 1 is at the upper left hand corner of the active area 30, which is typically easiest for a driver seated on the left side of the vehicle to view. Alternatively, for vehicles in which the steering wheel is on the right hand side of the vehicle, the active display position 40C may be assigned priority level 1, and thus the active display position 40D may be assigned priority level 2, display position 40A may be assigned priority level 3, and display position 40B may be assigned priority level 4.

The inactive display positions 50A-50D may also be assigned display position priority levels by the control module 14. In the example illustrated, inactive display position 50A is assigned priority level 5, inactive display position 50B is assigned priority level 6, inactive display position 50C is assigned priority level 7, and inactive display position 50D is assigned priority level 8. Thus in the example illustrated, the display position priority levels of the inactive area 32 increase across the inactive area 32 from the left to the right. Such an arrangement is typically most suitable for vehicles having the steering wheel on the left hand side of the vehicle. For vehicles having the steering wheel on the right hand side, the priority levels may be assigned differently. For example, inactive display positions 50C and 50D to the right of center line C of the inactive area 32 may be assigned a higher priority than the inactive display positions 50A and 50B on the left side of the center line C. Specifically, inactive display position 50C may be assigned priority level 5, inactive display position 50D may be assigned priority level 6, inactive display position 50A may be assigned priority level 7, and inactive display position 50B may be assigned priority level 8.

Figure 3:
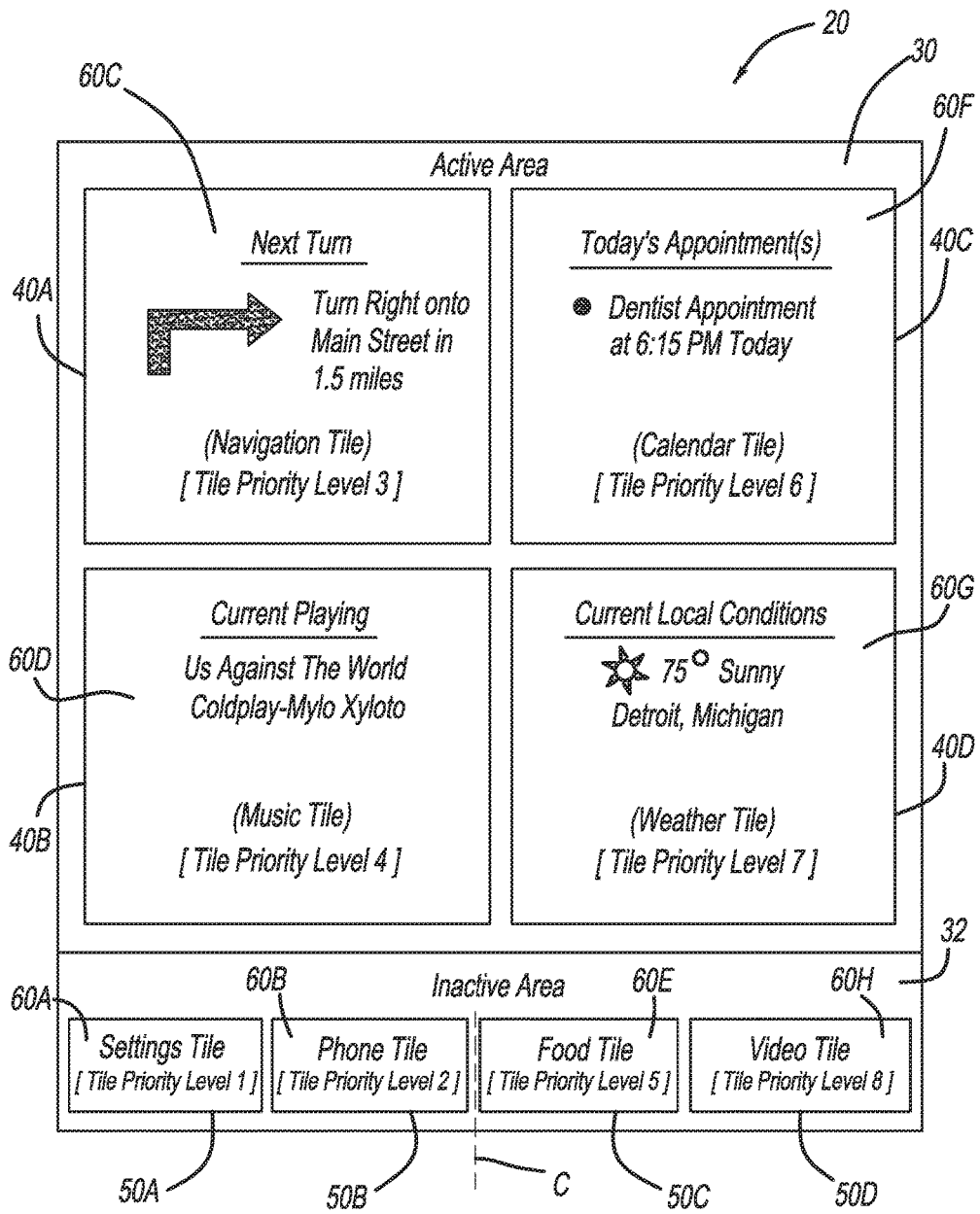
FIG. 3 illustrates the display of the user interface system, the display displaying a plurality of active and inactive tiles arranged in a first configuration.

With reference to FIG. 3, the control module 14 displays application tiles 60A-60H at the display positions 40A-40D and 50A-50D. The application tiles 60A-60H can be tiles, windows, and/or icons of any suitable application for use by a user, such as a driver and/or passenger of the vehicle 12. For example, application tile 60A can be a settings tile configured to allow a user to change various settings of the vehicle 12, the display 20, or any of the other applications; application tile 60B can be a phone tile configured to allow a user to access telecommunication features and functionality; application tile 60C can be a navigation tile configured to allow a user to access navigation features and functionality; application tile 60D can be a music tile configured to allow a user to access audio system features and functionality; application tile 60E can be a food or restaurant tile configured to allow a user to access restaurant options and information; application tile 60F can be a calendar tile configured to allow a user to access his/her calendar or another calendar; application tile 60G can be a weather tile configured to allow a user to access weather information options; and application tile 60H can be a video or movie tile configured to allow a user to access video and movie options.

The arrangement of tiles 60A-60H of FIG. 3 is provided for exemplary purposes only. The tiles 60C, 60D, 60F, and 60G are arranged in the active area 30, and the inactive tiles 60A, 60B, 60E, and 60H are arranged in the inactive area 32 for exemplary purposes only. Any of the active tiles 60C, 60D, 60F, and 60G may be deactivated and moved to the inactive area as described herein to provide a recyclable menu at the inactive area 32. Any of the inactive tiles 60A, 60B, 60E, and 60H may be activated and moved to the active area, as explained herein. The user can select and use the tiles 60A-60H in any suitable manner, such as by touching the tiles 60A-60H on the display 20 when configured as a touchscreen. If the display 20 is not configured as a touch screen, the tiles 60A-60H may be accessed in any other suitable manner, such as by using a selection device (e.g., a joystick or selector knob) of the passenger cabin 10 for example.

When the applications associated with any of the tiles 60A-60H are inactive, the tiles 60A-60H for the inactive applications are arranged in the inactive area 32. When inactive, the tiles 60A-60H merely display basic text, graphics, and/or an icon sufficient to allow a user to identify the particular application associated with each inactive tile. For example and as illustrated in FIG. 3, the inactive settings tile 60A merely includes a text label, as does the phone tile 60B, the food tile 60E, and the video tile 60H.

The active tiles in the active area 30 include information and/or functionality of the application associated therewith. For example, the active navigation tile 60C includes navigation functionality, such as the next turn. The active music tile 60D includes information regarding the song currently playing, for example. The active calendar tile 60F includes the current day's schedule, for example. The active weather tile 60G includes current weather conditions. Any one of the active tiles of the active area 30 can be selected in order to expand the active tile to encompass of the entire active area 30, and provide additional information and functionality to the user. For example, selecting the active navigation tile 60C will expand the navigation tile 60C to the entire active area and display additional navigation information, such as a map of the area surrounding the vehicle 12, and the location of the vehicle 12 relative thereto. Selecting the active music tile 60D will expand the music tile to display additional information, such as additional songs available for play. Selection of the active calendar tile 60F will expand the calendar tile 60F to display additional calendar information, such as the user's weekly or monthly schedule. Selection of the active weather tile 60G will provide additional weather information, such as an extended forecast, and/or weather for other locations. Selection of any one of the tiles of the inactive area 32, such as inactive tiles 60A, 60B, 60E, or 60H in the example illustrated, will be described further herein, such as in conjunction with the method 110 of FIG. 4.

Each one of the application tiles 60A-60H is assigned a tile priority level by the control module 14. The tile priority level may be assigned in any suitable manner. For example, the tile priority level may be set according to frequency of use. Therefore, in the example of FIG. 3 the settings tile 60A is assigned priority level 1 because it has historically been selected more than the other application tiles. The video application tile 60H is assigned priority level 8, the lowest priority level, because the application tile 60H has historically been selected the least. The priority levels of the application tiles 60A-60H can be assigned in any other suitable manner. For example, the priority levels of the application tiles 60A-60H can be pre-assigned by a manufacturer, or custom set by a user. The control module 14 can include memory configured to store the priority levels assigned by one or more users, and thus the control module 14 can customize the priority level settings as directed by the user of the interface system. To reset the display 20 such that the application tiles 60A-60H are arranged according to the assigned priority levels, and such that the priority levels of the application tiles 60A-60H matches the priority levels of the display positions 40A-40D and 50A-50D illustrated in FIG. 2, the reset/default button or selector 22 can be pressed or any other suitable reset/default command can be entered, to thereby instruct the control module 14 to reset the display 20.

Figure 4:
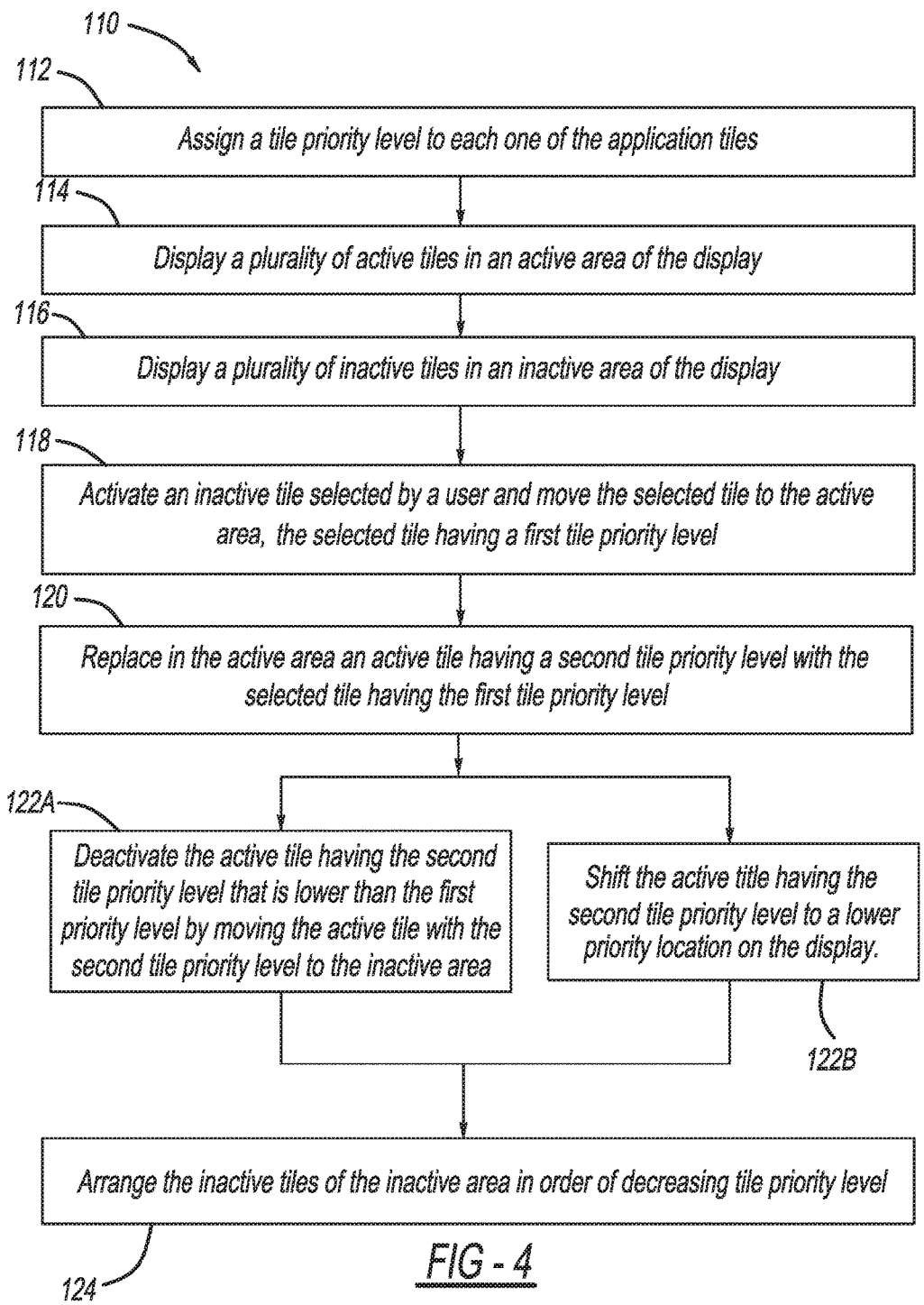
FIG. 4 illustrates a method according to the present teachings for operating the user interface system.

With continued reference to FIGS. 1-3, and additional reference to FIGS. 4-6, the method 110 for operating a user interface system, and activation of inactive application tiles 60A-60H present in the inactive area 32, will now be described. With initial reference to block 112, the control module 14 assigns a tile priority level to each one of the application tiles 60A-60H. The tile priority levels may be assigned in any suitable manner using any suitable methodology. For example, the tile priority levels may be assigned in order of frequency of use based on historical usage as monitored and determined by the control module 14. Thus the original equipment manufacturer, or any other suitable entity, may configure the control module 14 to assign an initial or default tile priority level to the application tiles 60A-60H. Prior to the user interface system first being used by the user, the control module 14 will arrange the application tiles 60A-60H such that their tile priority levels match the display position priority levels of the display positions 40A-40D and 50A-50D. The control module 14 will then track usage of the application tiles 60A-60H, and reassign the tile priority levels according to frequency of use.

As illustrated in FIG. 3, for example, the settings tile 60A will be assigned priority level 1 when historically the settings tile 60A is selected for use more frequently than the other application tiles 60B-60H. The priority levels can be assigned in any suitable manner. For example, a user of the user interface system may manually assign the tile priority levels according to his or her personal preference. The tile priority levels illustrated in FIG. 3 are merely exemplary, and thus any one of the application tiles 60A-60H can be assigned any one of the tile priority levels. To arrange the application tiles 60A-60H in order of tile priority after selection of different ones of the application tiles 60A-60H over a period of time, the user may press the reset/default button 22. Pressing the reset/default button 22 will arrange the application tiles 60A-60H in order of decreasing tile priority according to the tile priority levels set by the user, or if the user did not personalize the priority levels, arrange the application tiles 60A-60H in the order of decreasing priority according to the OEM default settings, or default settings entered by any other entity.

With reference to block 114 of the method 110, the control module 14, or any other suitable control module, displays a plurality of active tiles in the active area 30 of the display 20. Any of the tiles 60A-60H can be displayed. For example and as illustrated in FIG. 3, application tiles 60A, 60D, 60F, and 60G may be displayed. With reference to block 116, the control module 14 also displays a plurality of inactive tiles in the inactive area 32 of the display 20. Any of the application tiles 60A-60H may be displayed as active tiles in the active area 30, or as inactive tiles in the inactive area 32. For example and as illustrated in FIG. 3, active application tiles 60A, 60B, 60E, and 60H may be displayed as inactive tiles.

With reference to block 118, when a user selects any one of the application tiles 60A-60H arranged in the inactive area 32, such as any one of inactive tiles 60A, 60B, 60E, or 60H illustrated in FIG. 3, the control module 14 will activate the selected inactive tile by moving the selected tile to the active area 30 and activating functionality of the selected tile. For example and as illustrated in FIGS. 5 and 6, when the settings tile 60A is selected in the inactive area 32, the control module 14 will move the settings tile 60A from the inactive area 32 to the active area 30, and open the settings tile 60A to display basic functionality of the settings tile 60A, as illustrated in FIG. 6. Any suitable basic functionality may be provided, such as treble and bass settings, and display brightness. Upon selection of the settings tile 60A in the active area 30, the control module will further expand the settings tile 60A to fill the entire active area 30, and expand the functionality and options available to the user in any suitable manner, such as by making additional setting options available to the user.

The control module 14 will position the settings tile 60A in the active area 30 according to the tile priority level assigned to the settings tile 60A. For example and as illustrated in the figures, the settings tile 60A is assigned priority level 1. Therefore, and as illustrated in FIGS. 5 and 6, the settings tile 60A will be positioned by the control module 14 at the highest display position priority level of the display 20, which in the example of FIG. 2 is in the upper left hand corner of the active area 30. In applications where the display priority level 1 is at the upper right hand corner of the active area 30, such as in vehicles having the steering wheel arranged on the right side of the vehicle, the settings tile 60A will be moved by the control module 14 to the upper right hand corner of the active area 30. When moved to the active area 30, the settings tile 60A will replace the application tile already present at the display position assigned priority level 1, such as the navigation tile 60C as illustrated in the example of FIG. 3 (see block 120 of FIG. 4).

Figure 5:
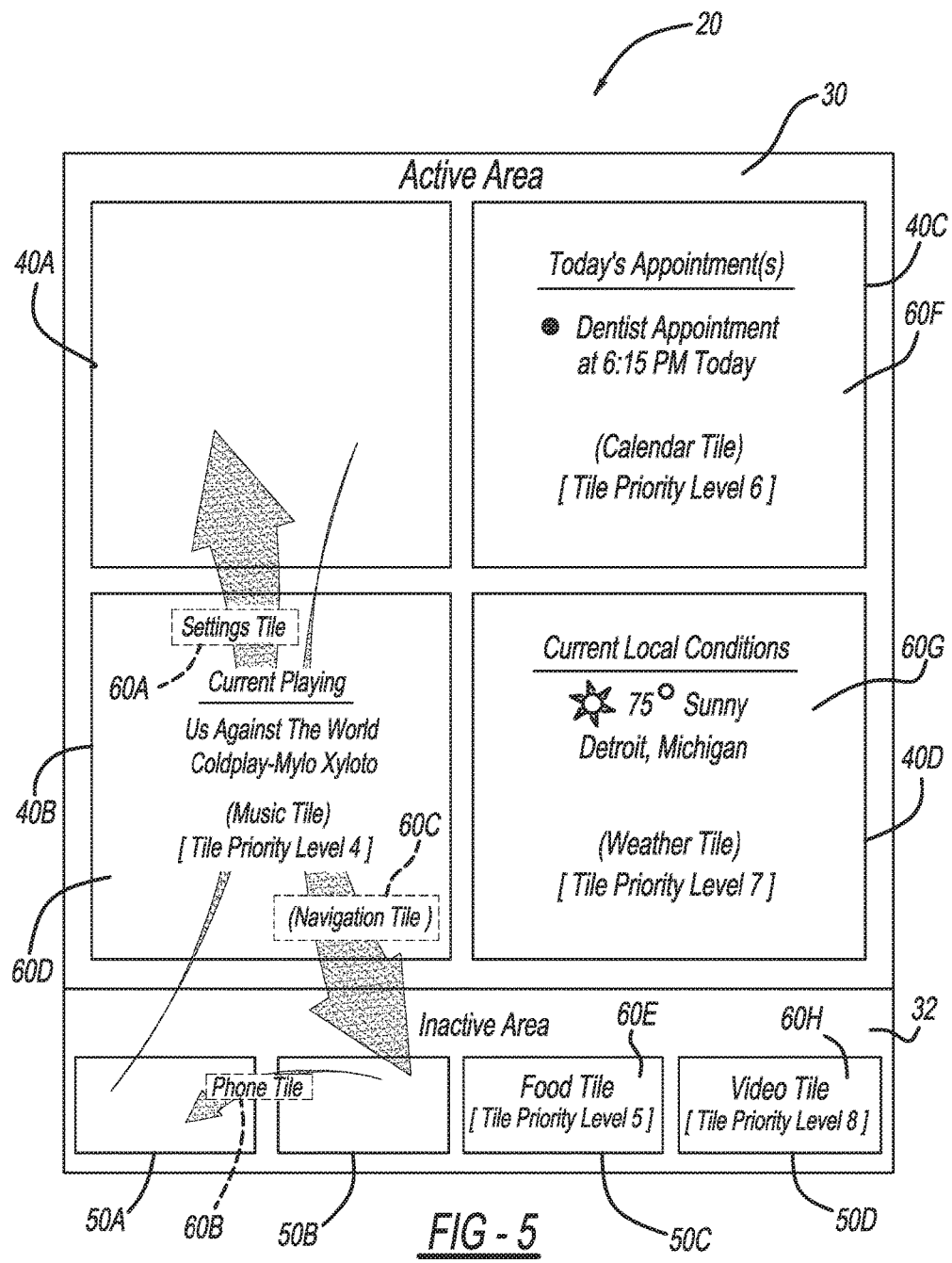
FIG. 5 illustrates the display transitioning from the first configuration of FIG. 3 to a second configuration in response to selection of one of the inactive tiles by a user.
Figure 6:
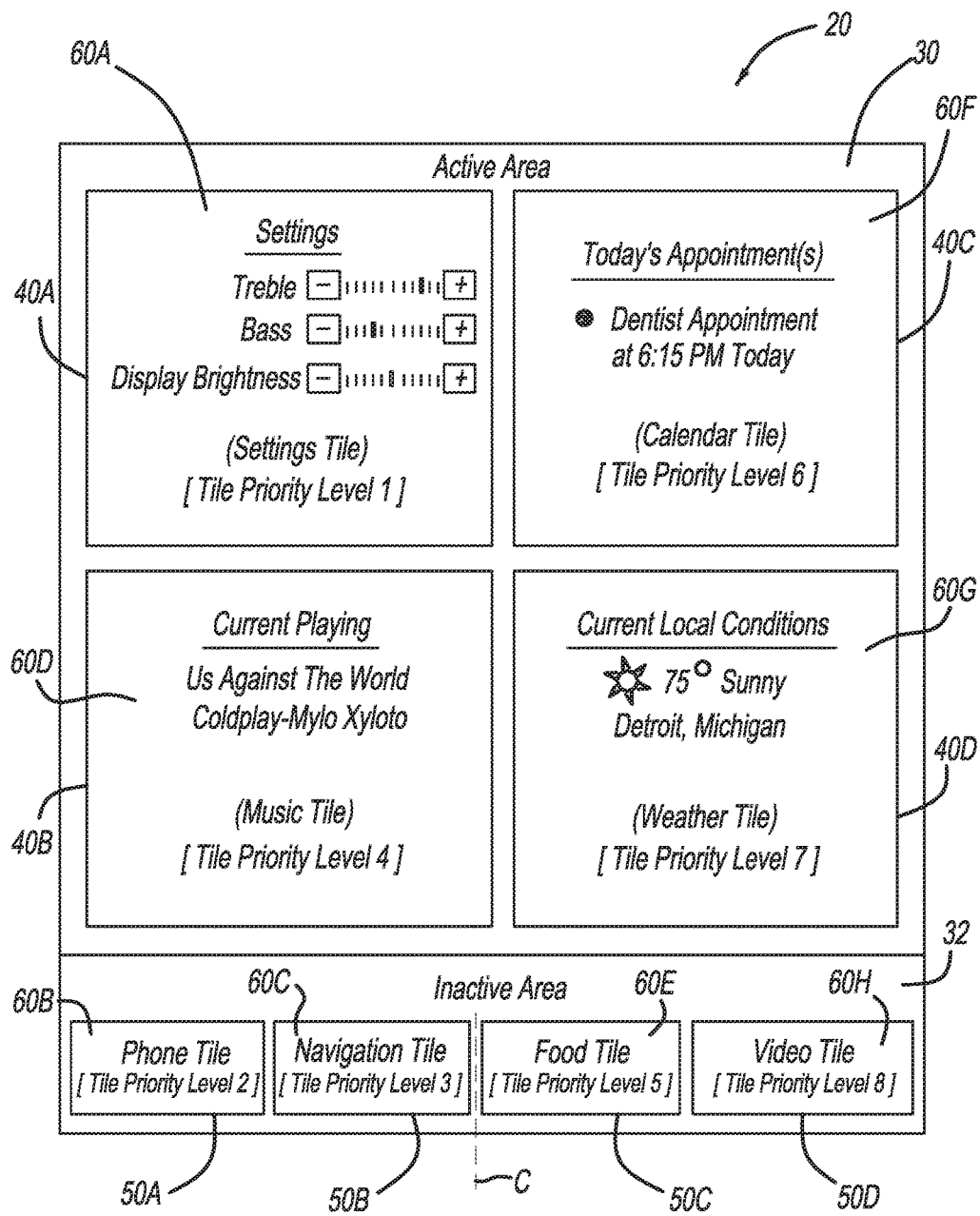
FIG. 6 illustrates the display in the second configuration in which the selected inactive tile has been activated and one of the active tiles has been deactivated and moved to the inactive area of the display.

With reference to block 122A, the control module 14 will deactivate the active navigation tile 60C, and move the navigation tile 60C to the inactive area 32, as illustrated in FIGS. 5 and 6. Alternatively, and with reference to block 122B, the navigation tile 60C can remain in the active area 30, but shifted to the next highest display position priority level, which in the example illustrated is display position priority level 2 in the lower left hand corner of the active area 30. All of the other application tiles in the active area 30 will then be moved by the control module 14 down a display position priority level. For example, the control module 14 will move the music tile 60D to the display position priority level 3 in the upper right hand corner of the active area 30, and move the calendar tile 60F to display position priority level 4 in the lower right hand corner of the active area 30. The weather tile 60G will be moved by the control module 14 to the inactive area 32.

With reference to block 124, the control module 14 arranges the application tiles present in the inactive area 32 according to the tile priority level assigned thereto to provide a recyclable menu in the inactive area 32. For example and as illustrated in FIGS. 5 and 6, when the navigation tile 60C is moved from the active area 30 to the inactive area 32, the control module 14 will position the navigation tile 60C between the phone tile 60B and the food tile 60E so that the tile priority levels increase from left to right across the inactive area 32 when the display position priority levels increase left to right, as illustrated in FIG. 2. In applications where the steering wheel is on the right hand side of the vehicle 12, the control module 14 will organize the inactive area 32 such that the highest tile priority level of the inactive tiles is on the immediate right hand side of the centerline C of the inactive area 32, and the second highest tile priority level is to the immediate right of the highest tile priority level. The application tiles 60A-60H with the second and third highest tile priority levels will be arranged by the control module 14 on the left hand side of the centerline C such that the tile priority levels increase from left to right.

With continued reference to FIG. 3, additional examples of arrangement of the application tiles 60A-60H by the control module 14 when different ones of the application tiles 60A-60H are selected will now be described. For example, when the phone tile 60B is selected in the inactive area 32, the control module 14 will move the phone tile 60B to the display position having priority level 1 (in the upper left hand corner) because the tile priority of the phone tile 60B has a higher priority (tile priority level 2) than the other tiles of the active area 30, and expand the phone tile 60B to make basic functionality thereof available to the user. The control module 14 will then either move the navigation tile 60C to the inactive area 32, or shift the navigation tile 60C to the next highest display position priority level, which in the example illustrated is level 2 in the lower left hand corner of the active area 30. The control module 14 will then shift the music tile 60D to display position priority level 3 in the upper right hand corner of the active area 30, shift calendar tile 60F to display position priority level 4 in the lower right hand corner of the active area 30, and move the weather tile 60G to the inactive area 32, where the control module 14 will rearrange the inactive tiles in order of tile priority level.

When the food tile 60E is selected from the inactive area 32, the control module 14 will arrange the food tile 60E in the upper right hand corner of the active area 30 in order to replace the calendar tile 60F because each one of the navigation and music tiles 60C and 60D have tile priority levels that are higher than the food tile 60E, and the calendar tile 60F has as a tile priority level 6 that is lower in priority than the food tile 60E, which has a tile priority level 5. The control module 14 will then move the calendar tile 60F to the inactive area 32 in some applications, or shift the calendar 60F down a display position priority level to the lower right hand corner of the active area 30, and then move the weather tile 60G to the inactive area 32. The control module 14 will then arrange the tiles of the inactive area 32 according to tile priority level as discussed above. Upon selection of the video tile 60H, the control module 14 will replace the weather tile 60G with the video tile 60H because the weather tile 60G has the lowest tile priority level of all of the tiles of the active area 30.

The present teachings thus provide improved user interface systems and methods that facilitate selection of various applications and access to functionality and features thereof. By arranging the application tiles 60A-60H according to tile priority levels assigned thereto, based on frequency of use for example, the user can more easily access the application that he/she most often uses or is most likely to use.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A user interface system comprising:
   a display;
   a reset button; and
   a control module configured to:
   display a plurality of active tiles in an active area of the display;
   display a plurality of inactive tiles in an inactive area of the display;
   assign a priority level to each one of the active tiles and the inactive tiles;
   activate an inactive tile selected by a user by moving the selected tile to the active area and activating an application associated with the selected tile, the selected tile having a first priority level;
   deactivate an active tile having a second priority level that is lower than the first priority level by moving the active tile with the second priority level to the inactive area;
   replace in the active area the active tile having the second priority level with the selected tile having the first priority level, while maintaining a position of each one of the plurality of active tiles having a priority level that is higher than the first priority level;
   arrange the inactive tiles of the inactive area in order of decreasing priority level, while maintaining a position of each one of the plurality of inactive tiles having a priority level that is higher than the second priority level; and
   position the plurality of active tiles and the plurality of inactive tiles according to the assigned priority level in an order of decreasing priority when the reset button is actuated.

2. The user interface system of claim 1, wherein the display is configured for installation in a vehicle.

3. The user interface system of claim 1, wherein the control module is configured to assign any one of the tiles with the following functionality: navigation system functionality; audio system functionality; video system functionality; telecommunications system functionality; weather information functionality; personal calendar functionality; restaurant information functionality, or system setting functionality.

4. The user interface system of claim 1, wherein the control module is configured to activate the inactive tile selected by the user when the user touches an area of the display corresponding to location of the inactive tile in the inactive area.

5. The user interface system of claim 1, wherein at least one of the plurality of active tiles displays an interface for a navigation system application, a music system application, a weather application, a calendar application, a restaurant finder application, a video application, or a telephone application.

6. The user interface system of claim 1, wherein each one of the plurality of inactive tiles includes a label indicating functionality available for use by the user when any one of the plurality of inactive tiles are activated.

7. The user interface system of claim 1, wherein the control module is configured to assign the priority level based on frequency of use.

8. The user interface system of claim 7, wherein the control module is configured to arrange the most frequently used active tile at an upper left corner of the active area, and arrange the most frequently used inactive tile at a left side of the inactive area.

9. The user interface system of claim 7, wherein the control module is configured to arrange the most frequently used active tile at an upper right corner of the active area, and arrange the most frequently used inactive tile immediately adjacent a center line of the inactive area on a right side of the center line.

10. The user interface of claim 1, wherein the display is a touchscreen.

11. A method for controlling a user interface comprising:
   displaying a plurality of active tiles in an active area of the display;
   displaying a plurality of inactive tiles in an inactive area of the display;
   assigning a priority level to each one of the active tiles and the inactive tiles;
   activating an inactive tile selected by a user by moving the selected tile to the active area and activating an application associated with the selected tile, the selected tile having a first priority level;
   deactivating an active tile having a second priority level that is lower than the first priority level by moving the active tile with the second priority level to the inactive area;
   replacing in the active area the active tile having the second priority level with the selected tile having the first priority level, while maintaining a position of each one of the plurality of active tiles having a priority level that is higher than the first priority level;
   arranging the inactive tiles of the inactive area in order of decreasing priority level, while maintaining a position of each one of the plurality of inactive tiles having a priority level that is higher than the second priority level; and
   arranging the plurality of active tiles and the plurality of inactive tiles according to the assigned priority level in an order of decreasing priority upon selection of a reset selector by a user;
   wherein the method is performed by a control module connected to the display.

12. The method of claim 11, further comprising assigning any one of the tiles with the following functionality: navigation system functionality; audio system functionality; video system functionality; telecommunications system functionality; weather information functionality; personal calendar functionality; restaurant information functionality, or system setting functionality.

13. The method of claim 11, further comprising activating the inactive tile selected by the user in response to the inactive tile being touched by the user on the display; wherein the display is a touchscreen.

14. The method of claim 11, further comprising providing each one of the inactive tiles with a label indicating functionality available for use by the user when any one of the plurality of inactive tiles are activated.

15. The method of claim 11, wherein the control module assigns the priority levels based on frequency of use.

16. The method of claim 15, wherein the control module arranges the most frequently used active tile at an upper left corner of the active area, and arranges the most frequently used inactive tile at a left side of the inactive area.

17. The method of claim 15, wherein the control module arranges the most frequently used active tile at an upper right corner of the active area, and arranges the most frequently used inactive tile immediately adjacent a center line of the inactive area on a right side of the center line.

18. The method of claim 11, wherein upon selection of an active tile by a user the control module enlarges the active tile to fill the entire active area of the display.

* * * * *